United States Patent
Blackson

(10) Patent No.: US 12,122,068 B2
(45) Date of Patent: Oct. 22, 2024

(54) SYSTEM AND METHOD TO AUTO-PRESSURIZE PRIOR TO DISPENSE IN A CIRCULATION DISPENSE SYSTEM

(71) Applicant: Graco Minnesota Inc., Minneapolis, MN (US)

(72) Inventor: Christopher R. Blackson, Uniontown, OH (US)

(73) Assignee: Graco Minnesota Inc., Minneapolis, MN (US)

(*) Notice: Subject to any disclaimer, the term of this patent is extended or adjusted under 35 U.S.C. 154(b) by 439 days.

(21) Appl. No.: 17/726,960

(22) Filed: Apr. 22, 2022

(65) Prior Publication Data
US 2022/0347888 A1  Nov. 3, 2022

Related U.S. Application Data

(60) Provisional application No. 63/183,465, filed on May 3, 2021.

(51) Int. Cl.
*B29B 7/74* (2006.01)
*B01F 35/71* (2022.01)
(Continued)

(52) U.S. Cl.
CPC ........ *B29B 7/7615* (2013.01); *B01F 35/7176* (2022.01); *B01F 35/7547* (2022.01);
(Continued)

(58) Field of Classification Search
CPC ..... B29B 7/7615; B29B 7/7447; B29B 7/728; B29B 7/7626; B29B 7/7684;
(Continued)

(56) References Cited

U.S. PATENT DOCUMENTS 4,019,652 A   4/1977  Suh et al.
4,779,762 A * 10/1988  Klein .................... B05B 12/085
                                                            422/111
(Continued)

FOREIGN PATENT DOCUMENTS

WO   2014099796 A1   6/2014
WO   2019207121 A1  10/2019

OTHER PUBLICATIONS

Graco, "Hydraulic, Plural-Component, Fixed-Ration Proportioner, for pouring and dispensing sealants and adhesives and polyurethane foam," www.graco.com, Revision ZAS, Nov. 2019, pp. 126.

(Continued)

*Primary Examiner* — Frederick C Nicolas
(74) *Attorney, Agent, or Firm* — Kinney & Lange, P. A.

(57) ABSTRACT

A system for generating and dispensing plural component materials includes a controller operatively connected to dispense valves and return valves. The return valves are in respective open states to allow constituent materials to circulate back to a source and are in respective closed states to block circulation. The dispense valves are in respective open states to allow mixing of the constituent materials to form the plural component material and in respective closed states to prevent generation and dispense. The controller implements a delay between closing the return valves and opening the dispense valves to build pressure in the system prior to generating and dispensing the plural component material.

21 Claims, 3 Drawing Sheets

(51) Int. Cl.
| | |
|---|---|
| *B01F 35/75* | (2022.01) |
| *B05B 12/00* | (2018.01) |
| *B05B 12/08* | (2006.01) |
| *B05B 12/14* | (2006.01) |
| *B05B 15/58* | (2018.01) |
| *B29B 7/72* | (2006.01) |
| *B29B 7/76* | (2006.01) |
| *F04B 49/035* | (2006.01) |
| *F04B 49/08* | (2006.01) |
| *F04B 49/20* | (2006.01) |
| *F04B 49/24* | (2006.01) |
| *F17D 1/14* | (2006.01) |
| *F17D 3/01* | (2006.01) |
| *F17D 3/05* | (2006.01) |

(52) U.S. Cl.
CPC .......... *B05B 12/006* (2013.01); *B05B 12/085* (2013.01); *B05B 12/1445* (2013.01); *B05B 15/58* (2018.02); *B29B 7/728* (2013.01); *B29B 7/7447* (2013.01); *B29B 7/7626* (2013.01); *B29B 7/7684* (2013.01); *B29B 7/7694* (2013.01); *F04B 49/035* (2013.01); *F04B 49/08* (2013.01); *F04B 49/20* (2013.01); *F04B 49/24* (2013.01); *F17D 1/14* (2013.01); *F17D 3/01* (2013.01); *F17D 3/05* (2013.01); *F04B 2205/05* (2013.01)

(58) Field of Classification Search
CPC .............. B29B 7/7694; B01F 35/7176; B01F 35/7547; F04B 49/035; F04B 49/08; F04B 49/20; F04B 49/24; F04B 2205/05; B05B 12/006; B05B 12/085; B05B 15/58; B05B 12/1445; F17D 1/14; F17D 3/01; F17D 3/05

See application file for complete search history.

(56) References Cited

U.S. PATENT DOCUMENTS

| | | | |
|---|---|---|---|
| 4,809,909 A * | 3/1989 | Kukesh | B29B 7/7409 239/336 |
| 5,433,587 A | 7/1995 | Bankert et al. | |
| 5,645,217 A * | 7/1997 | Warren | B05B 7/32 239/75 |
| 5,857,589 A * | 1/1999 | Cline | B05C 11/1005 222/63 |
| 5,992,686 A * | 11/1999 | Cline | B29B 7/94 222/63 |
| 7,044,340 B1 | 5/2006 | McClellan | |
| 7,938,295 B2 | 5/2011 | Wootton | |
| 8,075,302 B1 | 12/2011 | McClellan | |
| 9,010,367 B2 | 4/2015 | McCormick et al. | |
| 9,056,327 B2 * | 6/2015 | Courier | B05B 7/26 |
| 2004/0159672 A1 | 8/2004 | Auber et al. | |
| 2008/0078782 A1* | 4/2008 | Bien | B29B 7/7447 222/608 |
| 2016/0184846 A1* | 6/2016 | Pellin | B05B 7/1693 219/386 |
| 2017/0333927 A1* | 11/2017 | Ross | B05B 12/1436 |
| 2022/0105480 A1* | 4/2022 | Saidman | B05C 11/1036 |
| 2022/0105481 A1* | 4/2022 | Burkley | B05B 7/262 |

OTHER PUBLICATIONS

Extended European Search Report for EP Application No. 22170969.4, Dated Sep. 9, 2022, pp. 11.

* cited by examiner

SYSTEM AND METHOD TO AUTO-PRESSURIZE PRIOR TO DISPENSE IN A CIRCULATION DISPENSE SYSTEM

CROSS-REFERENCE TO RELATED APPLICATION(S)

This claims priority to U.S. Provisional Application No. 63/183,465 filed May 3, 2021, and entitled "SYSTEM AND METHOD TO AUTO-PRESSURIZE PRIOR TO DISPENSE IN A CIRCULATION DISPENSE SYSTEM," the disclosure of which is hereby incorporated by reference in its entirety.

BACKGROUND

This disclosure relates generally to plural component dispensing systems and more particularly to pressure control for dispensing plural component materials.

Plural component materials are formed by two or more constituent materials combining to form the plural component material. The constituent materials are individually pumped and are typically combined immediately prior to application. The resultant plural component material can be an insulator, such as foam, or can be paint, sealant, coating, adhesive, etc.

The plural component system can include circulation of the constituent components prior to dispense during which the components are mixed together. Circulating the materials before a dispense helps maintain the consistency of the materials, by preventing curing during a static period, and can help maintain better temperature conditioning of the materials. Typically, the circulation flow rate of the materials is lower than the flow rate during dispense. To provide a quality plural component material, the constituent materials require mixing at desired pressure levels.

The pressures of the circulating constituent materials are quite low during the circulation process, at a pressure level below that required for a specified mix. During the dispense, the circulation valves are closed and the dispense valves are opened, allowing the constituent materials to flow into the mixer to combine the materials prior to application on the substrate. If pressure is not at the desired dispense pressure level, this can result in a mix being dispensed at the beginning of the dispense process that has properties that differ from those of the specified mix.

Some circulation systems include mechanical hardware items, such as pressure regulators, to increase the pressures of the constituent materials during the circulation process. The pressure regulators are expensive, labor and time intensive to set up, and wear easily. In addition, such systems require additional valving in the form of a bypass valve in addition to the pressure regulator. Furthermore, circulating materials at high pressures requires more power plus will generate heat into the materials. Such systems typically require chiller units to extract such added heat prior to the dispense process. The addition of chiller units to the circulation process requires additional power, space, and resources.

SUMMARY

According to one aspect of the disclosure, a plural component dispensing system includes a first metering pump; a first feed line connected to the first metering pump to provide a first material to the first metering pump from a first material reservoir; a first output line connected to the first metering pump to receive the first material from the first metering pump, the first output line branching into a first dispense line and a first recirculation line, the first dispense line extending to a dispenser and the first recirculation line configured to provide the first material back to the first material reservoir; a first return valve configured to control flow of the first material through the first recirculation line; a first dispense valve configured to control flow of the first material to the dispenser from the first dispense line; a second metering pump; a second feed line connected to the second metering pump to provide a second material to the second metering pump from a second material reservoir; a second output line connected to the second metering pump to receive the second material from the second metering pump, the second output line branching into a second dispense line and a second recirculation line, the second dispense line extending to the dispenser and the second recirculation line configured to provide the second material back to the second material reservoir; a second return valve configured to control flow of the second material through the second recirculation line; a second dispense valve configured to control flow of the second material to the dispenser from the second dispense line; and a controller operatively connected to the first return valve, the second return valve, the first dispense valve, and the second dispense valve. The controller is configured to cause the first return valve and the second return valve to shift to respective closed states; and cause the first dispense valve and the second dispense valve to shift to respective open states after the first return valve and the second return valve are in the respective closed states and based on a parameter received or determined reaching a threshold.

According to an additional or alternative aspect of the disclosure, a controller for controlling a plural component dispensing system having a first metering pump configured to pump a first material through a first output line, a second metering pump configured to pump a second material through a second output line, a first return valve configured to control material flow through a first recirculation line of the first output line, a second return valve configured to control material flow through a second recirculation line of the second output line, a first dispense valve configured to control material flow to a dispenser from the first output line, and a second dispense valve configured to control material flow to the dispenser from the second output line includes control circuitry; and memory encoded with instructions. The memory is encoded with instructions that, when executed by the control circuitry, cause the controller, in response to a dispense signal, to cause the first return valve and the second return valve to shift to respective closed states; and cause the first dispense valve and the second dispense valve to shift to respective open states after the first return valve and the second return valve shift to the respective closed states and based on a parameter received or determined reaching a threshold.

According to another additional or alternative aspect of the disclosure, a method of dispensing a plural component material includes commanding, by a controller, a first return valve downstream of a first material pump and a second return valve downstream of a second material pump to shift to respective closed states, the first return valve disposed to control recirculation of a first material output from the first material pump and the second return valve disposed to control recirculation of a second material output from the second material pump; and commanding, by the controller, a first dispense valve downstream of the first material pump and a second dispense valve downstream of the second material pump to shift to respective open states after the first return valve and the second return valve are in the respective closed states based on a parameter monitored by the controller reaching a threshold, the first dispense valve and the second dispense valve disposed to control flow of the first material and the second material to a dispenser, the dispenser configured to combine the first material and the second material to form a plural component material.

DETAILED DESCRIPTION

This disclosure is related to a process and system for dispensing plural component materials. Multiple constituent materials are combined at a dispenser to form the plural component material that is then output from the system by the dispenser. The plural component system is configured to combine at least two constituent materials to form the plural component material. The plural component dispensing system includes a first output line extending from a first material pump that branches to extend to the dispenser and back to a first material supply and includes a second output line that extends from a second material pump that branches to extend to the dispenser and back to a second material supply. The system is configured such that the constituent materials can recirculate when the plural component material is not being dispensed. A controller controls actuation of return valves associated with material flow through circulation lines and dispense valves associated with material flow to the dispenser to build pressure of the constituent materials prior to initiating mixing and dispense of the constituent materials. The process and system provides high quality, consistent plural component mixtures throughout the dispense process.

Figure 1:
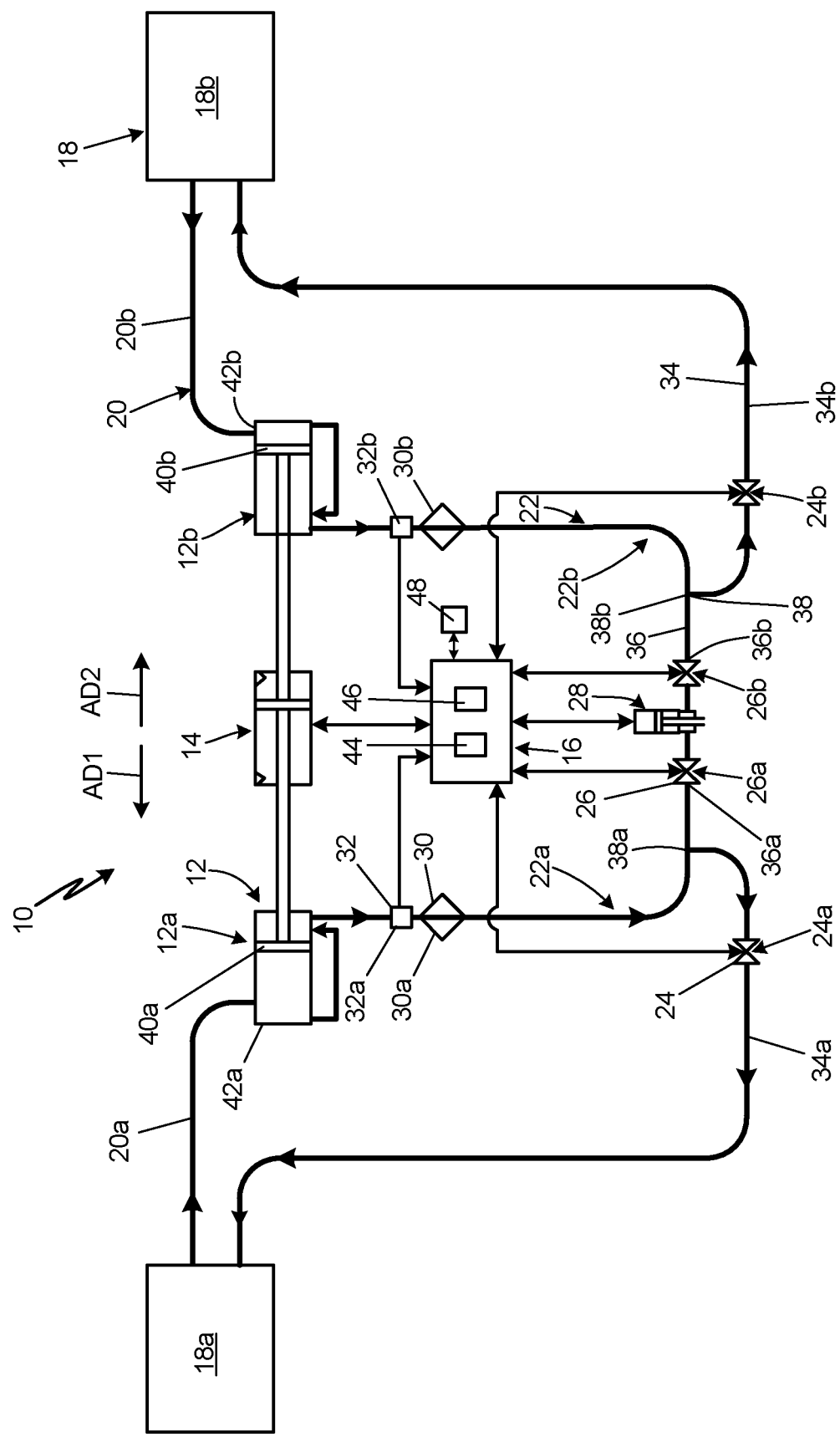
FIG. 1 is a schematic diagram of a plural component dispense system.

FIG. 1 is a schematic diagram of plural component dispense system 10. Plural component dispense system 10 includes material pumps 12a, 12b (collectively herein "material pump 12" or "material pumps 12"); pump drive 14; controller 16; material supplies 18a, 18b (collectively herein "material supply 18" or "material supplies 18"); feed lines 20a, 20b (collectively herein "feed line 20" or "feed lines 20"); output lines 22a, 22b (collectively herein "output line 22" or "output lines 22"); return valves 24a, 24b (collectively herein "return valve 24" or "return valves 24"); dispense valves 26a, 26b (collectively herein "dispense valve 26" or "dispense valves 26"); dispenser 28; heaters 30a, 30b (collectively herein "heater 30" or "heaters 30"); and pressure sensors 32a, 32b (collectively herein "pressure sensor" or "pressure sensors"). Output lines 22a, 22b respectively include return lines 34a, 34b (collectively herein "return line 34" or "return lines 34"), dispense lines 36a, 36b (collectively herein "dispense line 36" or "dispense lines 36"), and intersections 38a, 38b (collectively herein "intersection 38" or "intersections 38"). Controller 16 includes memory 44, control circuitry 46, and user interface 48.

System 10 is a plural component dispensing system configured to combine constituent components to form a resultant plural component material. For example, the plural component material can be an insulator, such as foam, or can be paint, sealant, coating, adhesive, etc. In some examples, system 10 is configured to combine a first constituent material, such as a resin (e.g., polyol resin), and a second constituent material, such as a catalyst (e.g., isocyanate), that combine to form a spray foam. While system 10 is shown and described as a system that combines two constituent materials to form the plural component material, it is understood that system 10 can be configured to combine more than two constituent materials to form the plural component material.

Material supplies 18 store the individual constituent materials. For example, each material supply 18 can be formed as a tank, drum, etc. Material pumps 12 receive the constituent materials from material supplies 18 through feed lines 20 and pump the constituent materials downstream through output lines 22. Each output line 22 branches at an intersection 38 into a dispense line 36 that extends to the dispenser 28 and return line 34 that extends back to the associated material supply 18. The return lines 34 can also be referred to as circulation lines.

In the example shown, material pumps 12a, 12b are disposed to receive the first and second constituent materials from material supplies 18a, 18b, respectively. Feed lines 20a, 20b extend to material pumps 12a, 12b from material supplies 18a, 18b. Output lines 22a, 22b extend downstream from material pumps 12a, 12b, respectively, and respectively branch at intersections 38a, 38b. Dispense lines 36a, 36b are portions of output lines 22a, 22b that extend from intersections 38a, 38b, respectively, to dispenser 28. Return lines 34a, 34b are portions of output lines 22a, 22b that extend from intersections 38a, 38b and back to material supplies 18a, 18b, respectively.

The material pumps 12a, 12b pressurize the constituent materials and drive the constituent materials through output lines 22a, 22b. In some examples, the constituent materials are pressurized to an upstream pressure level greater than ambient prior to being received by material pumps 12a, 12b. The material pumps 12a, 12b then increase the pressures of the constituent materials to a downstream pressure level greater than the upstream pressure level and drive the constituent materials downstream through the output lines 22a, 22b according to the downstream pressure level. For example, the material supplies 18 can be pressurized tanks that output the pressurized constituent materials or system 10 can include upstream pumps that draw the constituent materials from the material supplies 18 and drive the constituent materials through the feed lines 20 and to the material pumps 12, among other options. Such upstream pumps can also be referred to as transfer pumps. Material pumps 12 can also be referred to as metering pumps because material pumps 12 output the constituent materials at a metered flow rate to generate a desired mix at dispenser 28.

In the example shown, material pumps 12a, 12b are linked for simultaneous reciprocation. Linking material pumps 12a, 12b for simultaneous reciprocation causes pumps to output the constituent materials according to a desired ratio for mixing and generating the plural component material. More specifically, material pumps 12a, 12b are connected to pump drive 14 to be reciprocated by pump drive 14. Material pumps 12 and pump drive 14 can be considered to form a pump assembly of the system 10. The material pumps 12a, 12b respectively include fluid displacers 40a, 40b, such as pistons or diaphragms, among other options, that are reciprocated to pump the constituent materials. Pump drive 14 can be of any desired configuration suitable for driving reciprocation of the fluid displacers 40a, 40b. For example, pump drive 14 can be an electric motor, pneumatically drive, hydraulically drive, etc. Controller 16 is operatively connected, electrically and/or communicatively, to pump drive 14 to control the speeds of material pumps 12. For example, controller 16 can be operatively connected to a motor controller of the electric motor or to a fluid supply configured to route driving fluid (e.g., compressed air or hydraulic oil) to drive linear displacement, etc.

In the example shown, material pumps 12a, 12b are configured as piston pumps such that fluid displacers 40a, 40b are formed as pistons that reciprocate within cylinders 42a, 42b, respectively. In the example shown, material pumps 12a, 12b are configured as double displacement pumps that output the constituent materials during both a stroke in a first axial direction AD1 and a stroke in an opposite, second axial direction AD2.

Pressure sensors 32a, 32b are operatively associated with output lines 22a, 22b, respectively. Pressure sensors 32 are configured to generate data regarding the pressures of the constituent materials downstream of the material pumps 12. For each output line 22, the associated pressure sensor 32 is disposed to sense the constituent material pressure at a portion of the associated output line 22 upstream of the intersection 38 where the output line 22 branches to the dispense line 36 and return line 34.

Heaters 30a, 30b are operatively associated with output lines 22a, 22b. Each heater 30 is configured to increase a temperature of the constituent materials flowing through the output line 22 associated with that heater 30. Heaters 30 increase the temperature of the constituent material to reduce viscosity and provide improved flow characteristics to the constituent material. In the example shown, pressure sensors 32 are associated with a portion of output lines 22 upstream of heaters 30, though it is understood that pressure sensors 32 can be disposed at any desired location upstream of dispense valves 26.

Dispenser 28 is configured to receive the multiple constituent materials and mix the constituent materials to form the plural component material. Dispenser 28 can be of any desired configuration for applying the multiple component material. For example, dispenser 28 can be configured as a handheld sprayer that includes a handle configured to be grasped by a single hand of the user and that can be actuated to generate a dispense signal that initiates the dispense process. The plural component material can thus be generated by the user actuating a trigger. In some examples, dispenser 28 can be an automatic dispenser configured to dispense the plural component material, such as a dispenser 28 mounted on a serial robot arm or other type of position manipulator.

Dispense valves 26 are configured to control flow of the constituent materials to dispenser 28. Dispense valves 26 are actuatable between respective open states, allowing the constituent materials to enter into and mix within dispenser 28, and closed states, preventing the constituent materials from entering into and mixing within dispenser 28. Dispense valves 26a, 26b are operatively associated with dispense lines 36a, 36b downstream of the intersections 38a, 38b. Dispense valve 26a controls flow of the constituent material output from material pump 12a to dispenser 28. Dispense valve 26b controls flow of the constituent material output from material pump 12b to dispenser 28.

Dispense valves 26 are actively controlled valves. Controller 16 is operatively connected to dispense valves 26, electrically and/or communicatively, to control actuation of the dispense valves 26 between the open and closed states. Dispense valves 26 can be configured as normally closed valves that are actuated to the open state by controller 16 providing a valve open signal, such as by controller 16 providing electrical energy to the dispense valves 26a, 26b, and that return to the closed state upon removal of the valve open signal. In some examples, controller 16 can actively provide both the open signal to dispense valves 26, causing dispense valves 26 to shift to the open states, and can actively provide the close signal, causing the dispense valves 26 to shift to the closed states. Removal of the open signal can also be considered as providing a close signal, in some examples.

Return valves 24 are configured to control the circulating flow of the constituent materials back to material supplies 18. Return valves 24 are actuatable between respective open states, allowing the constituent materials to flow through return lines 34 and back to material supplies 18, and closed states, preventing the constituent materials from circulating back to the material supplies 18. Return valves 24a, 24b are operatively associated with return lines 34a, 34b downstream of the intersections 38a, 38b. Return valve 24a controls flow of the constituent material output from material pump 12a back to material supply 18a. Return valve 24b controls flow of the constituent material output from material pump 12b back to material supply 18b.

Return valves 24 are actively controlled valves. Controller 16 is operatively connected to return valves 24, electrically and/or communicatively, to control actuation of the return valves 24 between the open and closed states. Return valves 24 can be configured as normally open valves that are actuated to the closed state by controller 16 providing a valve close signal, such as by controller 16 providing electrical energy to the return valves 24, and that return to the open state upon removal of the close signal. In some examples, controller 16 can actively provide both the close signal to return valves 24, causing return valves 24 to shift to the closed states, and can actively provide the open signal, causing the return valves 24 to shift to the open states. Removal of the close signal can also be considered as providing an open signal, in some examples.

Controller 16 is operatively connected, electrically and/or communicatively, to other components of system 10. In the example shown, controller 16 is operatively connected at least to dispense valves 26a, 26b; return valves 24a, 24b; pump drive 14; dispenser 28; and pressure sensors 32a, 32b, among other components. Controller 16 is configured to control operation of one or more of the various components, provide operating instructions to one or more of the various components, and/or receive information from one or more of the various components. Controller 16 is configured to store software, implement functionality, and/or process instructions. The controller 16 can include memory 44 and control circuitry 46 configured to implement functionality and/or process instructions. For example, the control circuitry 46 can be capable of processing instructions stored in the memory 44. Examples of the control circuitry 46 can include one or more of a processor, a microprocessor, a controller, a digital signal processor (DSP), an application specific integrated circuit (ASIC), a field-programmable gate array (FPGA), or other equivalent discrete or integrated logic circuitry. The controller 16 can be of any suitable configuration for gathering data, processing data, etc. The controller 16 can receive inputs, provide outputs, generate commands for controlling operation of components of system 10, etc. The controller 16 can include hardware, firmware, and/or stored software. The controller 16 can be entirely or partially mounted on one or more circuit boards. The controller 16 can be configured to receive inputs and/or provide outputs via user interface 48.

User interface 48 can be any graphical and/or mechanical interface that enables user interaction with controller 16. For example, user interface 48 can implement a graphical user interface displayed at a display device of user interface 48 for presenting information to and/or receiving input from a user. User interface 48 can include graphical navigation and control elements, such as graphical buttons or other graphical control elements presented at the display device. User interface 48, in some examples, includes physical navigation and control elements, such as physically actuated buttons or other physical navigation and control elements. In general, user interface 48 can include any input and/or output devices and control elements that can enable user interaction with controller 16.

Memory 44 can be configured to store data and information before, during, and/or after operation. The memory 44, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, the memory 44 is a temporary memory, meaning that a primary purpose of the memory 44 is not long-term storage. The memory 44, in some examples, is described as volatile memory, meaning that the memory 44 does not maintain stored contents when power to controller 16 is turned off. Examples of volatile memories can include random access memories (RAM), dynamic random access memories (DRAM), static random access memories (SRAM), and other forms of volatile memories. In some examples, the memory 44 is used to store program instructions for execution by the control circuitry 46. The memory 44, in one example, is used by software or applications running on controller 16 to temporarily store information during program execution. The memory 44, in some examples, also includes one or more computer-readable storage media. The memory 44 can be configured to store larger amounts of information than volatile memory. The memory 44 can further be configured for long-term storage of information. In some examples, the memory 44 includes non-volatile storage elements. Examples of such non-volatile storage elements can include magnetic hard discs, optical discs, flash memories, or forms of electrically programmable (EPROM) or electrically erasable and programmable (EEPROM) memories.

System 10 is configured to operate in a circulation mode, during which the constituent materials are drawn from material supplies 18a, 18b and pumped back to material supplies 18a, 18b, and a dispense mode, during which the constituent materials mix within dispenser 28 to form the plural component material and are output from dispenser 28 for application. During operation, controller 16 controls operation of dispense valves 26a, 26b and return valves 24a, 24b to pre-pressurize the constituent materials prior to the constituent materials entering into dispenser 28 and mixing to form the plural component material.

System 10 is initially in the circulation mode. Dispense valves 26a, 26b are in their respective closed states, preventing flow to dispenser 28, and return valves 24a, 24b are in their respective open states, allowing the constituent materials to flow downstream through return lines 34a, 34b and back to material supplies 18a, 18b. The constituent materials circulate at a reduced pressure as compared to the desired dispense pressure. The reduced pressure reduces wear on the various components of system 10 between dispense events.

Pump drive 14 powers material pumps 12a, 12b that receive the constituent materials from feed lines 20a, 20b and drive the constituent materials downstream through output lines 22a, 22b. Material pumps 12a, 12b are configured to output the constituent materials at a first flow rate with system 10 in the circulation mode, which first flow rate can also be referred to as a circulation flow rate. In some examples, the flow rate can be determined by flow meters associated with the output lines 22a, 22b. In some examples, the flow rate can be determined based on the reciprocation speed of the fluid displacers 40a, 40b of the material pumps 12a, 12b. Controller 16 commands the pump drive 14 to cause the material pumps 12a, 12b to output flows of the first and second constituent materials according to the circulation flow rate during the circulation mode. The first constituent material flows through output line 22a, the open return valve 24a, and return line 34a back to material supply 18a. The second constituent material flows through output line 22b, the open return valve 24b, and return line 34b back to material supply 18b.

System 10 enters a dispense mode to generate and emit the plural component material. For example, a dispense signal can be transmitted to controller 16 to cause system 10 to enter the dispense mode. In some examples, the dispense signal is generated based on the user actuating a trigger of the dispenser 28.

Controller 16 controls actuation of dispense valves 26a, 26b and return valves 24a, 24b to cause system 10 to generate and output the plural component material. Controller 16 causes the return valves 24a, 24b to shift to respective closed states while the dispense valves 26a, 26b remain in their respective closed states. With each of dispense valves 26a, 26b and return valves 24a, 24b in their respective closed states, the portions of output lines 22a, 22b extending downstream from material pumps 12a, 12b and disposed upstream of the dispense valves 26a, 26b and return valves 24a, 24b are closed. Material pumps 12a, 12b continue pump the first and second constituent materials into the output lines 22a, 22b, increasing the material pressures in the output lines 22a, 22b upstream of the dispense valves 26a, 26b.

Controller 16 is operatively associated with material pumps 12a, 12b to control the material outputs of material pumps 12a, 12b. Controller 16 can cause material pumps 12a, 12b to accelerate to increase the flow rate of the material output by the material pumps 12a, 12b. For example, controller 16 can provide a command to pump drive 14 to cause pump drive 14 to increase the reciprocation speed of the fluid displacers 40a, 40b of material pumps 12a, 12b. Controller 16 causes the material pumps 12a, 12b to accelerate such that material pumps 12a, 12b output the constituent materials at a second flow rate with system 10 in the dispense mode. The second flow rate differs from the first flow rate. The second flow rate can also be referred to as a dispense flow rate. The dispense flow rate can be and is typically greater than the circulation flow rate. The examples discussed assume that the dispense flow rate differs from and is greater than the circulation flow rate.

In some examples, controller 16 is configured to generate and provide the acceleration signal to the pump drive 14 prior to causing the return valves 24a, 24b to shift to their respective closed states. Increasing the speed of the material pumps 12a, 12b prior to commanding the return valves 24a, 24b to shift to respective closed states allows the material pumps 12a, 12b to quickly increase the reciprocation speed, and thus the material flow rate, prior to building the pressure of the constituent materials.

Controller 16 monitors one or more triggering parameters of the system 10 and is configured to shift dispense valves 26a, 26b to respective open states, thus beginning generation and emission of the plural component material, based on a comparison of the parameter and a parameter threshold. The controller 16 can receiver or determine a value of the parameter. In some examples, the parameter is a material parameter of at least one of the constituent materials. For example, the parameter can be a pressure of one or both of the constituent materials. In such an example, the parameter can be referred to as a pressure parameter and the threshold can be referred to as a pressure threshold. Controller 16 receives pressure information from the pressure sensors 32 and compares that pressure information to the pressure threshold.

In examples utilizing a pressure threshold, controller 16 is configured to cause the dispense valves 26a, 26b to shift to respective open states based on the pressure information indicating that the material pressure has reached or exceeded the pressure threshold. The controller 16 can be configured to monitor the material pressures of both the first constituent material and the second constituent material. In some examples, controller 16 can cause the dispense valves 26a, 26b to shift to respective open states based on one of the material pressures reaching or exceeding the pressure threshold. For example, controller 16 can cause the dispense valves 26a, 26b to shift to respective open states based on whichever material pressure first reaches the pressure threshold. In some examples, the user can select the material for which the material pressure is the monitored parameter. For example, the user can designate material pump 12a as a control pump and the controller 16 can then compare the pressure date from pressure sensor 32a to the pressure threshold and control dispense valves 26a, 26b based on that comparison. In such an example, controller 16 can disregard the pressure data from the other pressure sensor 32b. In some examples, controller 16 can cause the dispense valves 26a, 26b to shift to respective open states based on both of the material pressures reaching or exceeding the pressure threshold.

System 10 can dispense multiple different forms of plural component materials by feeding different constituent materials to system 10. The various plural component materials are configured to be mixed according to a mix recipe to provide desired quality and attributes to the resulting plural component material. The mix recipe includes, among other mix parameters, a mix pressure and a mix ratio between the constituent materials. The mix ratio can be controlled by sizing the material pumps 12a, 12b and/or output lines 22a, 22b to output the constituent materials at the desired ratio. For example, material pump 12a can be configured to generate twice the displacement volume per stroke length as material pump 12b to provide a 2:1 ratio between the constituent materials. System 10 can be configured to generate the plural component material according to a mix recipe. The mix recipe can specify the ratios of the constituent materials, the pressure at which the constituent materials mix, etc. Different mix recipes can have different target mix pressures depending on the particular materials forming the constituent materials.

In some examples, the pressure parameter can be set at a level less than the target mix pressure, such as 60% of the target mix pressure, 70% of the target mix pressure, 75% of the target mix pressure, 80% of the target mix pressure, 85% of the target mix pressure, 90% of the target mix pressure, etc. Setting the pressure threshold at a level less than the target mix pressure facilitates quick opening of dispense valves 26a, 26b relative to building the pressure to the target mix pressure, while still providing increased pressure at dispenser 28 relative to the circulation pressure. Setting the pressure threshold based on the target mix pressure ties the pressurization portion of the dispense mode to the actual operating parameters of system 10, providing better mix quality and improving mixing once the dispense valves 26a, 26b are opened. The increased pressures at the initiation of the dispense generates plural component material having desired physical properties when dispenser 28 initially begins emitting the plural component material.

The mix recipe includes a mix pressure, which is the desired pressure at which the constituent materials are mixed together to form the plural constituent material. In some examples, controller 16 is configured to generate historic dispense data based on previous dispenses of a plural component material. The controller 16 can generate a target mix pressure for subsequent dispenses of that plural component material based on the historic dispense data. In some examples, each dispense event is associated with a desired volume of the plural component material, which dispense volume can be determined by the controller 16 during the dispense event based on the flow rate from the material pumps 12a, 12b. Controller 16 can determine that the desired volume has been dispensed based on the target dispense flow rate and the time that the dispense valves 26a, 26b are in the open state. For example, controller 16 can determine that a desired dispense volume of 500 cubic centimeters has been reached based on dispense valves 26a, 26b being open for 10 seconds and a dispense flow rate of 50 cubic centimeters per second.

In some examples, controller 16 is configured to generate the target mix pressure based on the historic dispense data. Controller 16 monitors the pressure information generated by the pressure sensors 32a, 32b during a first dispense event. The controller 16 records the actual pressure achieved during the first dispense event as the target mix pressure for a second, subsequent dispense event. In some examples, controller 16 can record the material pressure over a recordation period during the first dispense event and generate the target mix pressure based on an average of the material pressure over that recordation period. For example, the controller 16 can record the mix pressure during a three second, five second, ten second, or other time period during the first dispense event and average the recorded material pressures during that time period, though it is understood that the recordation period can be any desired length of time. In some examples, the controller can generate different target mix pressures for each constituent material, which may vary depending on the particular material type, viscosities, etc., and utilize those target mix pressures for comparison to the associated constituent material. In some examples, the recordation period is the terminal portion of the dispense event, immediately preceding the end of the dispense event. For example, the recordation period can be for a period immediately preceding the dispense valves 26a, 26b shifting back to respective closed states.

Controller 16 can generate the target mix pressures and store the target mix pressures in memory 44. In some examples, controller 16 is configured to generate target mix pressures for multiple different mix recipes and store the various target mix pressures in memory 44. During operation, the user can select a mix recipe, such as via user interface 48 of the controller 16, and the controller 16 can recall a target mix pressure from the memory 44 based on the selected mix recipe. Generating the target mix pressure based on the actual pressures achieved during one or more previous dispense events provides accurate pressure information for the actual configuration of system 10. Generating the target mix pressure accounts for variations in system 10, such as wear at an orifice of dispenser 28; variations in the sizes of output lines 22a, 22b; variations in viscosity; etc. Such target mix pressure generation facilitates opening dispense valves 26a, 26b based on a threshold pressure that is tied to the actual operating parameters of system 10, ensuring that constituent materials initially flow to and mix within dispenser 28 at high enough pressures to generate a plural component material having desired attributes.

In some examples, the parameter is a temporal parameter. For example, the temporal parameter can be a count of time since the dispense event was initiated, such as since controller 16 received the dispense signal. The threshold can be a temporal threshold. The controller 16 can be configured to initiate the count based on the dispense event being initiated. The controller 16 can cause the dispense valves 26a, 26b to shift to respective open states based on the count reaching the threshold. For example, the temporal threshold can be 3000 milliseconds (ms) and the controller 16 can cause the dispense valves 26a, 26b to open based on the count reaching 3000 ms.

In some examples, controller 16 is configured to monitor multiple triggering parameters of system 10 and cause the dispense valves 26a, 26b to shift to respective open states based on at least one of the multiple parameters satisfying an associated threshold. For example, controller 16 can both monitor the material pressure and start a count based on the dispense event being initiated. Controller 16 compares the actual material pressure to a pressure threshold and compares the count to a temporal threshold. Controller 16 causes the dispense valves 26a, 26b to shift to respective open states based on whichever threshold is first satisfied. Configuring controller 16 to monitor multiple triggering parameters and open the dispense valves 26a, 26b based on at least one of the parameters satisfying an associated threshold builds material pressure to provide desired material properties while eliminating the possibility of undue delay between triggering and the dispenser 28 actually outputting material.

Controller 16 can be configured to monitor multiple triggering parameters of system 10 and cause the dispense valves 26a, 26b to shift to respective open states based on each of the multiple parameters satisfying an associated threshold. For example, controller 16 can monitor both the material pressure and start a count based on the dispense event being initiated. In such an example, the controller 16 causes the dispense valves 26a, 26b to shift to respective open states based on the material pressure of at least one of the constituent materials reaching or exceeding the pressure threshold and the count reaching the temporal threshold.

System 10 provides significant advantages. Controller 16 closes return valves 24 and maintains dispense valves 26 closed based on a dispense signal. Such a configuration builds pressure in the output lines 22 upstream of dispense valves 26. Building the pressure prior opening dispense valves 26 cause system 10 to generate an initial plural component material having desired material properties because the constituent materials do not mix and undesirably low pressures. The constituent materials circulate through the open return valves 24 when system 10 is not dispensing, reducing wear on material pumps 12, thereby reducing maintenance requirements, reducing downtime, and reducing costs. Controller 16 can control opening of dispense valves 26 based on one or more triggering parameters, ensuring output of the plural component material within a desired timeframe after generation of the dispense signal.

System 10 further eliminates the need to circulate the constituent materials at the desired dispense pressures prior to dispensing, eliminating the need for expensive hardware components that require periodic maintenance and adjustment (e.g., pressure regulators). System 10 utilizes less hardware than such constant pressure systems, providing for a less expensive and simpler plural component dispensing system. System 10 thereby reduces power consumption and the generation of heat that may need to be counteracted by chillers in other systems, further reducing resource consumption, maintenance costs, and material costs.

Further, controller 16 can store pressure data for previous dispense events and can update such pressure information after each dispense event. Controller 16 can thus identify the end of a pressurization phase based on the actual operating information for system 10 itself, providing more accurate information and high quality mixes. Controller 16 generating and recording the information further allows system 10 to continuously adjust based on changing parameters of system 10 itself, such as changing material restriction sizes, changes in material viscosity, etc. System 10 automatically accounting for and adjusting to changes eliminates the need for manual inputs, thereby reducing downtime and decreasing the chance of user-introduced error.

Figure 2:
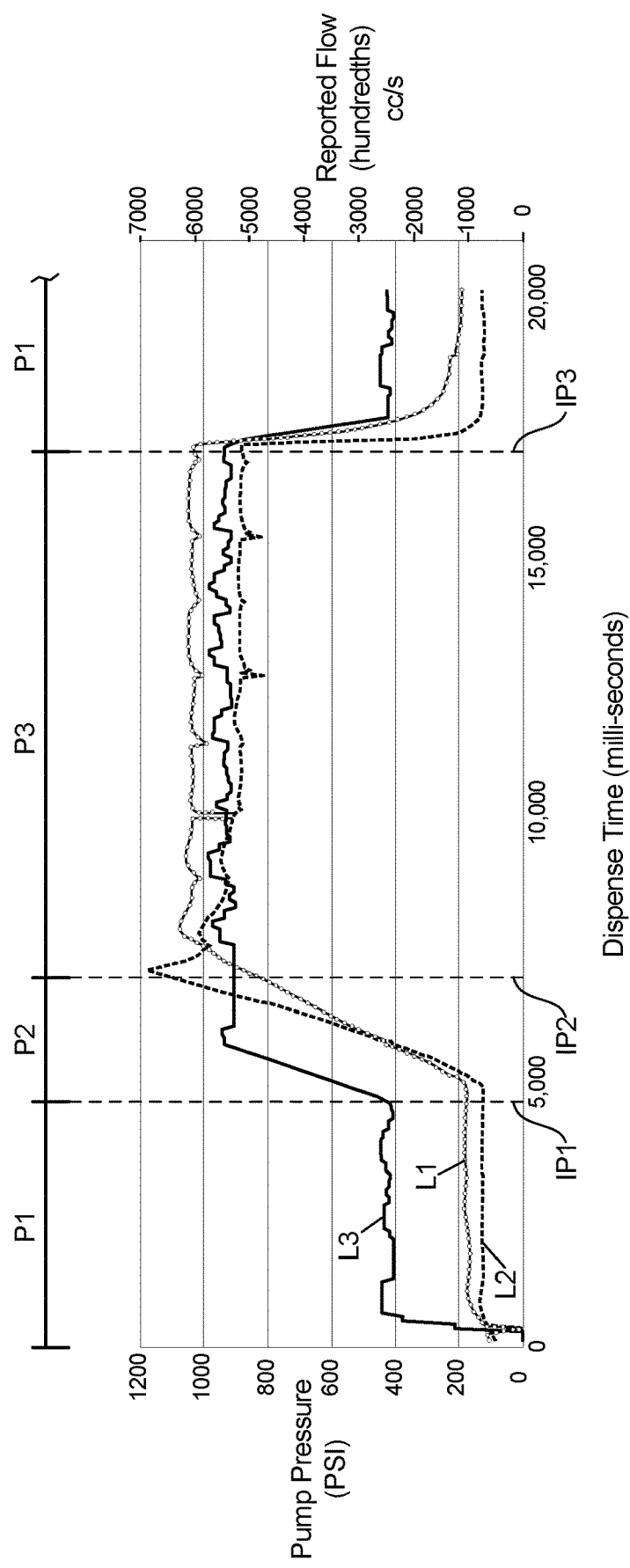
FIG. 2 is a graph illustrating a pressurization procedure.

FIG. 2 is a graph illustrating parameters of the dispense system 10 during an example dispense event. In the graph, the lefthand vertical axis is pressure in pounds per square inch, the righthand vertical axis is flowrate in hundredths of a cubic centimeter per second, and the horizontal axis is dispense time in milliseconds.

For the example dispense event, the target mix pressure is 1000 psi (about 6.89 MPa). The pressure threshold is set at 86% of the target mix pressure, which is 860 psi (about 5.93 MPa) in this example, and the temporal threshold is set at 3000 ms. In the example shown, line L1 is the pressure output by a first material pump (e.g., material pump 12a), line L2 is the pressure output by a second material pump (e.g., material pump 12b), and line L3 is the flow rate from the pump assembly. In the example shown, the circulation flow rate is commanded to 25 cubic centimeters per second (cc/s) and the dispense flowrate is set to 55 cc/s. The dispense flow rate is measured based on the speed of reciprocation of the pump drive (e.g., pump drive 14) that drives displacement of the first and second material pumps. The first material pump and the second material pump are configured to output material at different flow rates in the example shown, with the first material pump configured as an 80 cc pump and the second material pump configured as a 65 cc pump. It is understood, however, that the first and second material pumps can be sized to provide any desired ratio downstream to the dispenser.

Phases P1-P3 are phases of the dispense event for the plural component dispensing system. In phase P1, the two materials are circulating through the plural component dispensing system. The first constituent material is circulating at about 180 psi (about 1.24 MPa) and the second constituent material is circulating at about 165 psi (about 1.14 MPa). The pump assembly is generating a flow at about the desired circulation flow rate of about 25 cc/s.

A dispense command is generated and provided to the controller (e.g., controller 16 (FIG. 1)) at point IP1. The dispense command causes the dispense event to enter into the second phase P2. Phase P2 can also be referred to as the pressurization phase. In phase P2, the controller commands the pump drive to accelerate to increase the flow rate output by the first and second material pumps. The controller further commands the return valves to shift to respective closed states. In the example shown, the pump drive begins to accelerate the pumps about 100 ms prior to the return valves shifting to their respective closed states. The pump drive accelerates to the dispense flow rate during the second phase P2 and prior to the dispense event shifting to the third phase P3. Initiating acceleration prior to closing the return valves provides less resistance in the output lines during acceleration, facilitating quicker acceleration. It is understood that, in some examples, the acceleration command is provided to the pump drive simultaneously with a close command being provided to the return valves. In other examples, the return valves can be commanded to close prior to the pump drive being commanded to accelerate.

With the return valves closed, the first material pressure and the second material pressure build downstream of the material pumps. The first and second dispense valves shift to their respective open states at point IP2. The controller provides an open command to the dispense valves to initiate mixing and dispense of the plural component material. With the dispense valves in their respective open states, the constituent materials can freely flow into the dispenser to mix and form the plural component material.

In the example shown, the material pressure of the first material, which material pressure is represented by line L1, is being monitored and compared to the pressure threshold by the controller. The point IP2 occurs when the material pressure of the first material reaches the pressure threshold, which pressure threshold is 860 psi (about 5.93 Mpa) in the example shown. The material pressure of the second material exceeded the pressure threshold and the desired dispense pressure in this example. However, the material pressure of the second material was disregarded because the material pressure of the first material was designated as the relevant pressure parameter. In some examples, both of the first material and the second material can be monitored and the controller can cause the dispense valves to shift to the respective open states based on whichever of the material pressures first reaches the pressure threshold or based on both material pressures reaching the pressure threshold. In the example shown, the point IP2 is about 2300 ms after the dispense signal is provided to the controller at point IP1, such that the temporal threshold is not reached during the phase P2 in this example. If, however, the relevant material pressure had not reached the pressure threshold within 3000 ms after phase P2 began, the controller would have caused the dispense valves to open at that point based on the count satisfying the temporal threshold.

In phase P3, the dispense valves are in the respective open states and the return valves are in respective closed states. The material pressure of the second material drops due to the configuration of the output line (e.g., output line 22b (FIG. 1)) extending downstream from the second material pump. The pressure of the first material continues to rise during an initial portion of the third phase P3. The material pressures remain relatively stable during the dispense phase P3 as the materials are being fed into the dispenser to mix and be output from the dispenser. In some examples, the material pressures of both of the constituent materials can continue to rise once the dispense process enters the phase P3.

In the example shown, the flow rate reaches the desired dispense flow rate during the pressurization phase P2 prior to the dispense process entering the phase P3. As such, the pump speed is increased to the desired dispense pump speed during the phase P2 and prior to the dispense process entering phase P3. Increasing the flow rate to the desired dispense flow rate during pressurization and prior to opening the dispense valves ensures consistent flow during the dispense phase P3. A consistent flow rate facilitates even application of the plural component material, increasing user confidence and providing consistent, uniform material distribution.

The controller can cause the process to exit phase P3 based on a temporal length of the phase P3 and the desired dispense volume. In the example shown, the dispense is configured as a 550 cc application of the plural component material. The controller causes the dispense valves to close ten seconds after opening, which is associated with the desired dispense volume of 550 cc at the desired dispense flow rate of 55 cc/s. Phase P3 ends at point IP3. At point IP3, the controller commands the dispense valves to shift to respective closed states, the controller commands the return valves to shift to respective open states, and the controller commands the pump drive to decelerate such that the material pumps pump material at the circulation flow rate.

The dispense process proceeds back to phase P1 from the dispense phase P3. In phase P1, the materials are pumped downstream from the material pumps and circulate to the material sources through the open return valves. The dispense valves are in respective closed states such that the materials cannot mix and instead are routed through the open return valves. The material circulates until another dispense cycle, which includes the pressurization and dispense phases P2, P3, is triggered and the controller controls operation of the components of the system to build pressure and dispense the plural component material.

The process of dispensing plural component materials provides significant advantages. The materials reach the target dispense pressure early in the dispense process such that the material pressures are at steady state pressure for a majority of the dispense phase P3. In some examples, the material pressures are at steady state pressure for at least 90% of the dispense phase P3. Building material pressure prior to opening the dispense valves builds sufficient pressure to generate plural component materials having desired material properties, providing higher quality mixtures with greater consistency as compared to building pressure throughout the dispense. The material pumps can pump at lower pressures during the circulation phase P1, which reduces wear and tear on the material pumps, reducing costs and providing greater component life. The material pumps accelerate to output material at the dispense flow rate prior to the dispense valves shifting to respective open states. Accelerating the material pumps prior to opening the dispense valves provides a consistent flow of the plural component material output by the system throughout the dispense phase P3.

Figure 3:
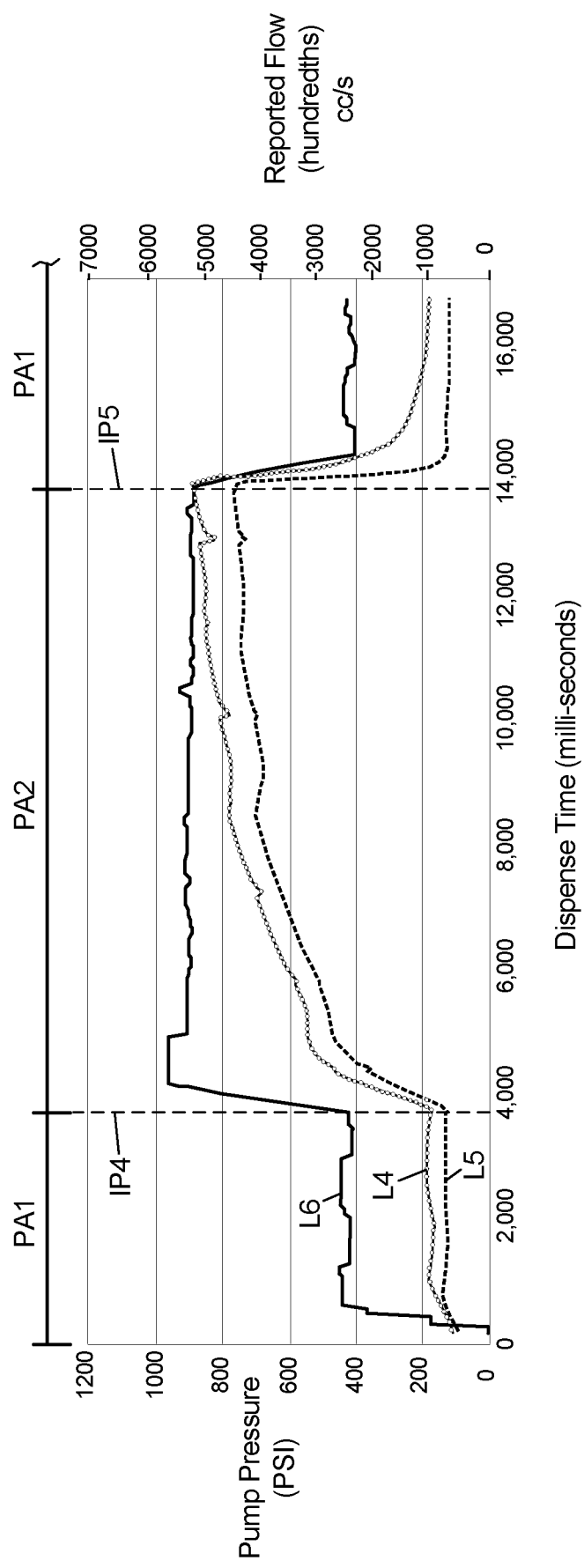
FIG. 3 is a graph illustrating a prior pressurization procedure.

FIG. 3 is a graph illustrating parameters of a dispense system operated according to a prior dispense methodology. In the graph, the lefthand vertical axis is pressure in pounds per square inch, the righthand vertical axis is flowrate in hundredths of a cubic centimeter per second, and the horizontal axis is dispense time in milliseconds.

Similar to the dispense event shown in FIG. 2, the target mix pressure is 1000 psi (about 6.89 MPa), the circulation flow rate is commanded to 25 cc/s, and the dispense flowrate is set to 55 cc/s. Line L4 is the pressure output by a first material pump, line L5 is the pressure output by a second material pump, and line L6 is the flow rate from the pump assembly.

The material circulates during phase PA1 A dispense signal is generated and provided to the controller at point IP4, at which point the system enters a second phase PA2. In the prior dispense methodology, the second phase PA2 is a combined pressurization and dispense phase. At point IP4, the controller commands the materials pumps to accelerate to output material at the dispense flow rate, the controller commands the dispense valves to shift to respective open states, and the controller commands the return valves to shift to respective closed states.

As shown, the individual material pressures build throughout the second phase PA2 but do not reach the target dispense pressure during the second phase PA2. In the example shown, the individual materials do not reach near optimal mixing pressures, which is about 80% of the desired dispense pressure in the example shown, until 8 seconds after the system enters the second phase PA2. The second phase PA2 lasts for 10 seconds until reaching point IP5, based on the target volume and dispense flow rate, which is the point at which the dispense ends because the desired volume of plural component material has been dispensed. As such, the system is outputting plural component material at less than optimum mixing pressures for a majority of the dispense process when operating according to the prior dispense methodology.

At point IP5, the dispense methodology exits the second phase PA2. The controller causes the material pumps to decelerate, the controller causes the dispense valves to close, and the controller causes the return valves to open. The dispense methodology proceeds back to the first phase PA1 from the second phase PA2.

DISCUSSION OF NON-EXCLUSIVE EXAMPLES

The following are non-exclusive descriptions of possible examples of the present invention.

A plural component dispensing system includes a first metering pump; a first feed line connected to the first metering pump to provide a first material to the first metering pump from a first material reservoir; a first output line connected to the first metering pump to receive the first material from the first metering pump, the first output line branching into a first dispense line and a first recirculation line, the first dispense line extending to a dispenser and the first recirculation line configured to provide the first material back to the first material reservoir; a first return valve configured to control flow of the first material through the first recirculation line; a first dispense valve configured to control flow of the first material to the dispenser from the first dispense line; a second metering pump; a second feed line connected to the second metering pump to provide a second material to the second metering pump from a second material reservoir; a second output line connected to the second metering pump to receive the second material from the second metering pump, the second output line branching into a second dispense line and a second recirculation line, the second dispense line extending to the dispenser and the second recirculation line configured to provide the second material back to the second material reservoir; a second return valve configured to control flow of the second material through the second recirculation line; a second dispense valve configured to control flow of the second material to the dispenser from the second dispense line; and a controller operatively connected to the first return valve, the second return valve, the first dispense valve, and the second dispense valve. The controller is configured to cause the first return valve and the second return valve to shift to respective closed states; and cause the first dispense valve and the second dispense valve to shift to respective open states after the first return valve and the second return valve are in the respective closed states and based on a parameter received or determined by the controller reaching a threshold.

The plural component dispensing system of the preceding paragraph can optionally include, additionally and/or alternatively, any one or more of the following features, configurations and/or additional components:

A first pressure sensor configured to sense a pressure of the first material in the first output line.

The parameter is a pressure of the first material as sensed by the first pressure sensor.

A second pressure sensor configured to sense a pressure of the second material in the second output line.

The threshold is a pressure threshold and wherein the controller is configured to cause the first dispense valve and the second dispense valve to shift to the respective open states based on the pressure of the first material or the pressure of the second material reaching the pressure threshold.

The parameter is a temporal count and the threshold is a temporal threshold.

A first heater disposed on the first output line upstream of the first dispense line; a first pressure sensor configured to sense a pressure of the first material within the first output line at a first location disposed between the first metering pump and the first heater; a second heater disposed on the second output line upstream of the second dispense line; and a second pressure sensor configured to sense a pressure of the second material within the second output line at a second location disposed between the second metering pump and the second heater.

The parameter is a material pressure of at least one of the first material in the first output line and the second material in the second output line; the threshold is a pressure threshold, the pressure threshold less than a dispense pressure such that the controller is configured to cause the first metering pump and the second metering pump to continue increase the pressures of the first material and the pressure of the second material after causing the first dispense valve and the second dispense valve to shift to the respective open states.

The controller is further configured to cause the first metering pump to increase speed to output the first material at a first dispense flow rate; and cause the second metering pump to increase speed to output the second material at a second dispense flow rate.

The controller is configured to command the first metering pump and the second metering pump to increase speed before causing the first return valve and the second return valve to shift to the respective closed states.

A pump drive operably connected to the first metering pump and the second metering pump to simultaneously drive displacement of a first piston of the first metering pump and a second piston of the second metering pump; wherein the controller is operatively connected to the pump drive.

The controller is further configured to monitor a pumped pressure level of at least one of the first material and the second material during a first dispense event; generate a pressure level setpoint based on the monitored pumped pressure level; and control the first material pump and the second material pump to output the first material and the second material based on the pressure level setpoint during a second dispense event subsequent to the first dispense event.

The parameter is a material pressure of at least one of the first material in the first outlet line and the second material in the second outlet line; and the threshold is a pressure threshold, the pressure threshold based on the pressure level setpoint.

A controller for controlling a plural component dispensing system having a first metering pump configured to pump a first material through a first output line, a second metering pump configured to pump a second material through a second output line, a first return valve configured to control material flow through a first recirculation line of the first output line, a second return valve configured to control material flow through a second recirculation line of the second output line, a first dispense valve configured to control material flow to a dispenser from the first output line, and a second dispense valve configured to control material flow to the dispenser from the second output line, the controller including control circuitry; and memory encoded with instructions that, when executed by the control circuitry, cause the controller, in response to a dispense signal, to cause the first return valve and the second return valve to shift to respective closed states; and cause the first dispense valve and the second dispense valve to shift to respective open states after the first return valve and the second return valve shift to the respective closed states and based on a parameter received or determined by the controller reaching a threshold.

The controller of the preceding paragraph can optionally include, additionally and/or alternatively, any one or more of the following features, configurations and/or additional components:

The controller, in response to the dispense signal, is further configured to cause the first metering pump to increase speed to output the first material at a first dispense flow rate; and cause the second metering pump to increase speed to output the second material at a second dispense flow rate.

The controller is further configured to command the first metering pump and the second metering pump to increase speed before causing the first return valve and the second return valve to shift to the respective closed states.

The parameter is a material pressure of at least one of the first material and the second material and the threshold is a pressure threshold; and the controller is further configured to receive a first pressure level of the first material from a first pressure sensor operatively associated with the first output line; receive a second pressure level of the second material from a second pressure sensor operatively associated with the second output line; compare the first pressure level and the second pressure level to the pressure threshold; and cause the first dispense valve and the second dispense valve to shift to the respective open states based on one of the first pressure level and the second pressure level reaching the pressure threshold.

The parameter is a temporal parameter and the threshold is a temporal threshold; and the controller is further configured to start a timer based on the dispense signal to generate a temporal count; compare temporal count to the temporal threshold; and cause the first dispense valve and the second dispense valve to shift to the respective open states based on the temporal count reaching the temporal threshold.

A method of dispensing a plural component material includes commanding, by a controller, a first return valve downstream of a first material pump and a second return valve downstream of a second material pump to shift to respective closed states, the first return valve disposed to control recirculation of a first material output from the first material pump and the second return valve disposed to control recirculation of a second material output from the second material pump; and commanding, by the controller, a first dispense valve downstream of the first material pump and a second dispense valve downstream of the second material pump to shift to respective open states after the first return valve and the second return valve are in the respective closed states based on a parameter monitored by the controller reaching a threshold, the first dispense valve and the second dispense valve disposed to control flow of the first material and the second material to a dispenser, the dispenser configured to combine the first material and the second material to form a plural component material.

The method of the preceding paragraph can optionally include, additionally and/or alternatively, any one or more of the following features, configurations and/or additional components:

Commanding, by the controller, the first dispense valve downstream of the first material pump and the second dispense valve downstream of the second material pump to shift to the respective open states after the first return valve and the second return valve are in the respective closed states based on the parameter monitored by the controller reaching the threshold includes monitoring, by the controller, a first material pressure of the first material in an output line extending from the first material pump; comparing, by the controller, the first material pressure to a threshold pressure level; and commanding, by the controller, the first dispense valve and the second dispense valve to shift to the respective open states based on the comparison of the first material pressure and the threshold pressure.

Commanding, by the controller, the first dispense valve downstream of the first material pump and the second dispense valve downstream of the second material pump to shift to the respective open states after the first return valve and the second return valve are in the respective closed states based on the parameter monitored by the controller reaching the threshold includes initiating, by the controller, a temporal count based on the controller receiving a dispense signal; and commanding, by the controller, the first dispense valve and the second dispense valve to shift to the respective open states based on the temporal count reaching a temporal threshold.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A plural component dispensing system comprising:
a first metering pump;
a first feed line connected to the first metering pump to provide a first material to the first metering pump from a first material reservoir;
a first output line connected to the first metering pump to receive the first material from the first metering pump, the first output line branching into a first dispense line and a first recirculation line, the first dispense line extending to a dispenser and the first recirculation line configured to provide the first material back to the first material reservoir;

a first return valve configured to control flow of the first material through the first recirculation line;
a first dispense valve configured to control flow of the first material to the dispenser from the first dispense line;
a second metering pump;
a second feed line connected to the second metering pump to provide a second material to the second metering pump from a second material reservoir;
a second output line connected to the second metering pump to receive the second material from the second metering pump, the second output line branching into a second dispense line and a second recirculation line, the second dispense line extending to the dispenser and the second recirculation line configured to provide the second material back to the second material reservoir;
a second return valve configured to control flow of the second material through the second recirculation line;
a second dispense valve configured to control flow of the second material to the dispenser from the second dispense line; and
a controller operatively connected to the first return valve, the second return valve, the first dispense valve, and the second dispense valve, the controller configured to:
cause the first return valve and the second return valve to shift to respective closed states; and
cause the first dispense valve and the second dispense valve to shift to respective open states after the first return valve and the second return valve are in the respective closed states and based on a parameter received or determined by the controller reaching a threshold.

2. The plural component dispensing system of claim 1, further comprising:
a first pressure sensor configured to sense a pressure of the first material in the first output line.

3. The plural component dispensing system of claim 2, wherein the parameter is a pressure of the first material as sensed by the first pressure sensor.

4. The plural component dispensing system of claim 2, further comprising:
a second pressure sensor configured to sense a pressure of the second material in the second output line.

5. The plural component dispensing system of claim 4, wherein the threshold is a pressure threshold and wherein the controller is configured to cause the first dispense valve and the second dispense valve to shift to the respective open states based on the pressure of the first material or the pressure of the second material reaching the pressure threshold.

6. The plural component dispensing system of claim 1, wherein the parameter is a temporal count and the threshold is a temporal threshold.

7. The plural component dispensing system of claim 1, further comprising:
a first heater disposed on the first output line upstream of the first dispense line;
a first pressure sensor configured to sense a pressure of the first material within the first output line at a first location disposed between the first metering pump and the first heater;
a second heater disposed on the second output line upstream of the second dispense line; and
a second pressure sensor configured to sense a pressure of the second material within the second output line at a second location disposed between the second metering pump and the second heater.

8. The plural component dispensing system of claim 1, wherein:
the parameter is a material pressure of at least one of the first material in the first output line and the second material in the second output line;
the threshold is a pressure threshold, the pressure threshold less than a dispense pressure such that the controller is configured to cause the first metering pump and the second metering pump to continue increase the pressures of the first material and the pressure of the second material after causing the first dispense valve and the second dispense valve to shift to the respective open states.

9. The plural component dispensing system of claim 1, wherein the controller is further configured to:
cause the first metering pump to increase speed to output the first material at a first dispense flow rate; and
cause the second metering pump to increase speed to output the second material at a second dispense flow rate.

10. The plural component dispensing system of claim 9, wherein the controller is configured to:
command the first metering pump and the second metering pump to increase speed before causing the first return valve and the second return valve to shift to the respective closed states.

11. The plural component dispensing system of claim 9, further comprising:
a pump drive operably connected to the first metering pump and the second metering pump to simultaneously drive displacement of a first piston of the first metering pump and a second piston of the second metering pump;
wherein the controller is operatively connected to the pump drive.

12. The plural component dispensing system of claim 1, wherein the controller is further configured to:
monitor a pumped pressure level of at least one of the first material and the second material during a first dispense event;
generate a pressure level setpoint based on the monitored pumped pressure level; and
control the first material pump and the second material pump to output the first material and the second material based on the pressure level setpoint during a second dispense event subsequent to the first dispense event.

13. The plural component dispensing system of claim 12, wherein:
the parameter is a material pressure of at least one of the first material in the first outlet line and the second material in the second outlet line; and
the threshold is a pressure threshold, the pressure threshold based on the pressure level setpoint.

14. A controller for controlling a plural component dispensing system having a first metering pump configured to pump a first material through a first output line, a second metering pump configured to pump a second material through a second output line, a first return valve configured to control material flow through a first recirculation line of the first output line, a second return valve configured to control material flow through a second recirculation line of the second output line, a first dispense valve configured to control material flow to a dispenser from the first output line, and a second dispense valve configured to control material flow to the dispenser from the second output line, the controller comprising:
control circuitry; and memory encoded with instructions that, when executed by the control circuitry,
cause the controller, in response to a dispense signal, to:
cause the first return valve and the second return valve to shift to respective closed states; and
cause the first dispense valve and the second dispense valve to shift to respective open states after the first return valve and the second return valve shift to the respective closed states and based on a parameter received or determined by the controller reaching a threshold.

15. The controller of claim 14, wherein the controller, in response to the dispense signal, is further configured to:
cause the first metering pump to increase speed to output the first material at a first dispense flow rate; and
cause the second metering pump to increase speed to output the second material at a second dispense flow rate.

16. The controller of claim 15, wherein the controller is further configured to:
command the first metering pump and the second metering pump to increase speed before causing the first return valve and the second return valve to shift to the respective closed states.

17. The controller of claim 14, wherein:
the parameter is a material pressure of at least one of the first material and the second material and the threshold is a pressure threshold; and
the controller is further configured to:
receive a first pressure level of the first material from a first pressure sensor operatively associated with the first output line;
receive a second pressure level of the second material from a second pressure sensor operatively associated with the second output line;
compare the first pressure level and the second pressure level to the pressure threshold; and
cause the first dispense valve and the second dispense valve to shift to the respective open states based on one of the first pressure level and the second pressure level reaching the pressure threshold.

18. The controller of claim 14, wherein:
the parameter is a temporal parameter and the threshold is a temporal threshold; and
the controller is further configured to:
start a timer based on the dispense signal to generate a temporal count;
compare temporal count to the temporal threshold; and
cause the first dispense valve and the second dispense valve to shift to the respective open states based on the temporal count reaching the temporal threshold.

19. A method of dispensing a plural component material, the method comprising:
commanding, by a controller, a first return valve downstream of a first material pump and a second return valve downstream of a second material pump to shift to respective closed states, the first return valve disposed to control recirculation of a first material output from the first material pump and the second return valve disposed to control recirculation of a second material output from the second material pump; and
commanding, by the controller, a first dispense valve downstream of the first material pump and a second dispense valve downstream of the second material pump to shift to respective open states after the first return valve and the second return valve are in the respective closed states based on a parameter monitored by the controller reaching a threshold, the first dispense valve and the second dispense valve disposed to control flow of the first material and the second material to a dispenser, the dispenser configured to combine the first material and the second material to form a plural component material.

20. The method of claim 19, wherein commanding, by the controller, the first dispense valve downstream of the first material pump and the second dispense valve downstream of the second material pump to shift to the respective open states after the first return valve and the second return valve are in the respective closed states based on the parameter monitored by the controller reaching the threshold comprises:
monitoring, by the controller, a first material pressure of the first material in an output line extending from the first material pump;
comparing, by the controller, the first material pressure to a threshold pressure level; and
commanding, by the controller, the first dispense valve and the second dispense valve to shift to the respective open states based on the comparison of the first material pressure and the threshold pressure.

21. The method of claim 19, wherein commanding, by the controller, the first dispense valve downstream of the first material pump and the second dispense valve downstream of the second material pump to shift to the respective open states after the first return valve and the second return valve are in the respective closed states based on the parameter monitored by the controller reaching the threshold comprises:
initiating, by the controller, a temporal count based on the controller receiving a dispense signal; and
commanding, by the controller, the first dispense valve and the second dispense valve to shift to the respective open states based on the temporal count reaching a temporal threshold.

* * * * *